(12) United States Patent
Hills et al.

(10) Patent No.: US 11,298,870 B2
(45) Date of Patent: Apr. 12, 2022

(54) METHODS FOR FORMING COMPOSITE PANELS

(71) Applicant: THE BOEING COMPANY, Chicago, IL (US)

(72) Inventors: Karen L. Hills, Everett, WA (US); Lon E. Switzer, Marysville, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/794,619

(22) Filed: Feb. 19, 2020

(65) Prior Publication Data
US 2021/0252772 A1    Aug. 19, 2021

(51) Int. Cl.
*B29C 63/00* (2006.01)
*B29C 63/04* (2006.01)

(52) U.S. Cl.
CPC .......... *B29C 63/04* (2013.01); *B29C 63/0017* (2013.01); *B29C 63/0065* (2013.01)

(58) Field of Classification Search
CPC ... B29C 63/00; B29C 63/001; B29C 63/0017; B29C 63/006; B29C 63/0065; B29C 63/04
See application file for complete search history.

(56) References Cited

U.S. PATENT DOCUMENTS

| | | | |
|---|---|---|---|
| 6,673,187 B2 * | 1/2004 | Nemchick | B64C 1/066 156/212 |
| 6,854,498 B2 | 2/2005 | Nemchick | |
| 7,666,269 B2 * | 2/2010 | Shaw | B64C 1/066 156/212 |
| 8,453,696 B2 * | 6/2013 | Boggs | B29C 63/046 156/479 |

* cited by examiner

*Primary Examiner* — Jacob T Minskey
*Assistant Examiner* — Matthew Hoover
(74) *Attorney, Agent, or Firm* — The Small Patent Law Group LLC; Joseph M. Butscher

(57) ABSTRACT

A method of forming a composite panel includes providing an initial composite material, heating the initial composite material, molding the initial composite material to form a preliminary composite panel having a main body connected to an outer edge and a laminate layer secured to the outer edge, and folding an exterior edge portion of the outer edge over an interior edge portion to provide an external folded edge having the laminate layer on at least a portion of an outer surface.

20 Claims, 5 Drawing Sheets

METHODS FOR FORMING COMPOSITE PANELS

FIELD OF EMBODIMENTS OF THE DISCLOSURE

Embodiments of the present disclosure generally relate to composite panels, and, more particularly, to methods of forming composite panels.

BACKGROUND OF THE DISCLOSURE

Various structures are formed from composite materials. For example, portions of aircraft may be formed from composite materials. The composite material may be or include a polymer matrix reinforced with fibers. Known fibers include glass, carbon, basalt, aramid, or the like.

Internal cabins of aircraft may include numerous composite panels. Composite panels such as sidewall and doorway liners within an internal cabin typically do not include exposed edges. In order to cover edges of a composite panel, an edge wrapping process is used. Typically, a decorative laminate is wrapped around an edge and glued to a back side of the panel.

For at least certain composite panels, an edge wrapping process is not amenable to automation. Instead, the edge wrapping process is typically performed manually. The process of manually edge wrapping a laminate around an edge of a composite panel is time and labor intensive. Moreover, such a manual edge wrapping process may be ergonomically awkward.

In one example, a panel is cured in a molding process. After the panel is cured, a decorative laminate is applied in a separate vacuum forming process. After the vacuum forming process, excess laminate is wrapped around the exposed edges, such as by hand. As can be appreciated, such a process is time and labor and intensive.

SUMMARY OF THE DISCLOSURE

A need exists for a system and method for efficiently covering a peripheral edge of a composite panel. Further, a need exists for a system of method for automatically covering a peripheral edge of a composite panel. Moreover, a need exists for efficiently and cost-effectively forming a composite panel having an edge wrapped decorative laminate.

With those needs in mind, certain embodiments of the present disclosure provide a method of forming a composite panel including providing an initial composite material, heating the initial composite material, molding the initial composite material to form a preliminary composite panel having a main body connected to an outer edge and a laminate layer secured to the outer edge, and folding an exterior edge portion of the outer edge over an interior edge portion to provide an external folded edge having the laminate layer on at least a portion of an outer surface.

In at least one embodiment, said folding includes folding the exterior edge portion along a groove between the exterior edge portion and the interior edge portion.

Said providing the initial composite material may include forming the initial composite material of a thermoplastic matrix and carbon fibers. In at least one embodiment, the carbon fibers are recycled.

In at least one embodiment, said heating includes heating the initial composite material to a temperature within a range between 500-650° F.

In at least one embodiment, said molding includes co-molding the preliminary composite panel along with the laminate layer.

In at least one embodiment, the main body has a first thickness, and the outer edge has a second thickness. The first thickness is greater than the second thickness. For example, the first thickness is twice the second thickness.

In at least one embodiment, said molding includes forming a groove in the outer edge. For example, said forming the groove includes forming the groove between the interior edge portion and the exterior edge portion. In at least one embodiment, said forming the groove includes forming the groove proximate to the laminate layer.

In at least one embodiment, said folding includes rolling the exterior edge portion of the outer edge onto the interior edge portion. In at least one embodiment, said folding provides the external folded edge having a same thickness as the main body.

The method may also include subsequently compressing the composite panel after said folding.

Certain embodiments of the present disclosure provide a composite panel including a main body connected to an outer edge and a laminate layer secured to the outer edge. An exterior edge portion of the outer edge is folded over an interior edge portion to provide an external folded edge having the laminate layer on at least a portion of an outer surface.

In at least one embodiment, the main body and the outer edge are formed of a thermoplastic matrix and carbon fibers.

In at least one embodiment, the main body has a first thickness, and the outer edge has a second thickness. The first thickness is greater than the second thickness. For example, the first thickness is twice the second thickness.

In at least one embodiment, the outer edge includes a groove between the interior edge portion and the exterior edge portion. The groove is proximate to the laminate layer.

In at least one embodiment, the external folded edge has a same thickness as the main body.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a composite panel including a thermoplastic layer having a matrix material (such as formed of thermoplastic fibers) and fiber material (such as carbon fibers). At least one decorative laminate is disposed on at least one face of the thermoplastic layer. An edge portion of the thermoplastic layer has a reduced thickness. The reduced thickness edge portion has a first segment separated from a second segment by a groove. The first segment and second segment, when combined together, have a same thickness as an adjoining main body portion.

Certain embodiments of the present disclosure provide a method of manufacturing a composite panel, including performing a first-stage compression molding to form a preliminary panel. The preliminary panel includes an interior edge portion and an exterior edge portion coupled together by a groove. The method further includes folding the exterior edge portion over the interior edge portion along the groove.

Embodiments of the present disclosure provide high quality, structurally sound composite panels that meet Federal Aviation Administration (FAA) requirements with respect to flammability. Further, embodiments of the present disclosure provide low cost and efficient manufacturing methods for forming composite panels. Embodiments of the present disclosure provide composite panels having edge-wrapped decorative laminates that are formed in less time and at less cost than known manual edge-wrapping techniques.

Figure 1:
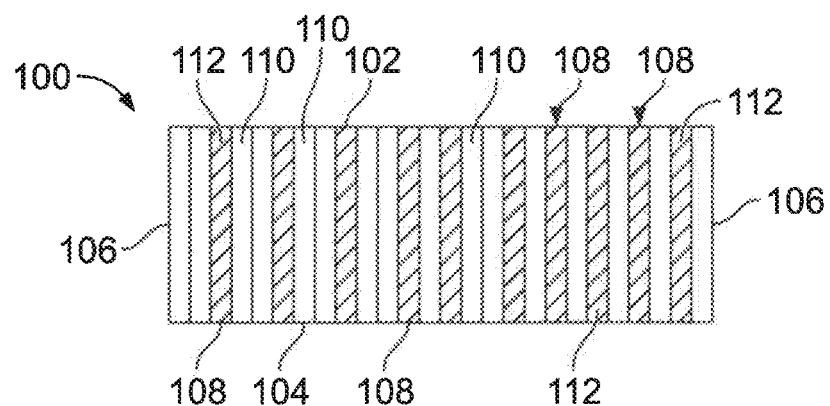
FIG. 1 illustrates a lateral view of an initial composite material, according to an embodiment of the present disclosure.

FIG. 1 illustrates a lateral view of an initial composite material 100, according to an embodiment of the present disclosure. The initial composite material 100 includes a top surface 102 coupled to a bottom surface 104 through peripheral edges 106. The initial composite material 100 is formed of a thermoplastic matrix 108 and carbon fibers 110. The thermoplastic matrix 108 includes a plurality of thermoplastic fibers 112. The carbon fibers 110 and the thermoplastic fibers 112 are distributed throughout the initial composite material 100. The carbon fibers 110 and the thermoplastic fibers 112 can be randomly distributed throughout the initial composite material 100. In at least one embodiment, the carbon fibers 110 may be recycled carbon fibers, such as provided from scrap from portions of a manufactured aircraft.

Figure 2:
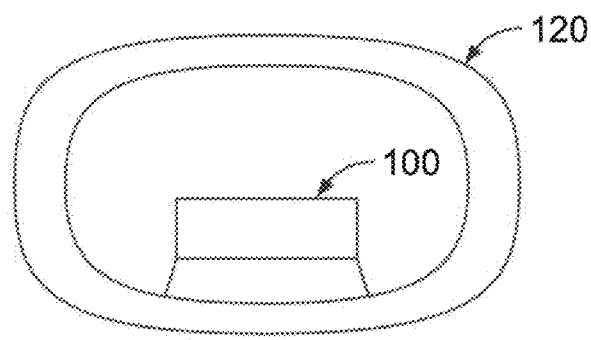
FIG. 2 illustrates a lateral view of the initial composite material within a heating device, according to an embodiment of the present disclosure.

FIG. 2 illustrates a lateral view of the initial composite material 100 within a heating device 120, according to an embodiment of the present disclosure. The heating device 120 can be an oven, autoclave, or the like. As another example, the initial composite material 100 can be heated by an external heating device, such as a blowtorch, for example.

Referring to FIGS. 1 and 2, in order to form a composite panel according to an embodiment of the present disclosure, the initial composite material 100 is first pre-heated so that the thermoplastic fibers 112 melt. The initial composite material 100 is heated within (and/or by) the heating device 120. For example, the initial composite material 100 is heated to a temperature within a range of 500-650° F. The range can be within the range 525-625° F. When the initial composite material 100 is heated to an initial pre-heated temperature (such as within a range of 500-650° F.), the thermoplastic matrix 108 including the thermoplastic fibers 112 melts.

Figure 3:
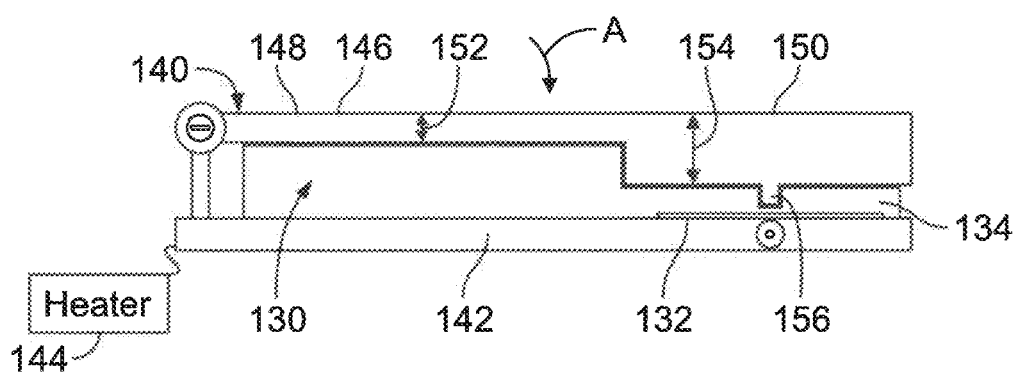
FIG. 3 illustrates a lateral view of a preliminary composite panel within a forming tool, according to an embodiment of the present disclosure.

FIG. 3 illustrates a lateral view of a preliminary composite panel 130 within a forming tool 140, according to an embodiment of the present disclosure. The forming tool 140 is an example of a forming system. The forming tool 140 can be a forming press, die, mold, or the like. Referring to FIGS. 1-3, after the initial composite material 100 is preheated, the initial composite material 100 is placed onto an over a base 142 of the forming tool 140. A laminate layer 132 is positioned over a portion of the base 142, underneath an edge 134 of the preliminary composite panel 130. The laminate layer 132 is configured to form an edge-wrapped decorative, as described herein. In at least one embodiment, the laminate layer 132 is a separate and distinct piece. The laminate layer 132 can be formed of the same material as the initial composite material 100, the thermoplastic matrix 108, the carbon fibers 110, another thermoplastic or polymer, and/or the like.

Accordingly, the laminate layer 132 is co-molded along with the preliminary composite panel 130, instead of being separately manually affixed in a subsequent process. As such, the process of forming a composite panel according to embodiments of the present disclosure is less costly and less labor intensive.

The forming tool 140 may be coupled to a heater 144, which heats the base 142 and/or an upper press 146. Optionally, the forming tool 140 may not be coupled to a heater. As another example, the forming tool 140 may be within and/or otherwise coupled to the heating device 120.

After the laminate layer 132 is disposed on the base 142, and the initial composite material 100 is disposed on the base 142 having an exterior edge portion over the laminate layer 132, the upper press 146 is urged onto the initial composite material 100 in the direction of arrow A, thereby forming the preliminary composite panel 130. The upper press 146 includes an interior body-forming segment 148 connected to an edge-forming segment 150. The interior body-forming segment 148 has a first depth 152, and the edge-forming segment 150 has a second depth 154 that is greater than the first depth 152. For example, the second depth 154 may be twice the first depth 152. The edge-forming segment 150 also includes a groove-forming protuberance 156 extending downwardly therefrom. The groove-forming protuberance 156 can be across a central portion of the edge-forming segment 150.

As the upper press 146 compresses the initial composite material 100 against the base 142, the heated initial composite material 100 compresses in response thereto. As the initial composite material 100 is compressed, the melted thermoplastic matrix 108 bonds the carbon fibers 110, thereby forming a homogenous structure, thereby resulting in the preliminary composite panel 130.

Figure 4:
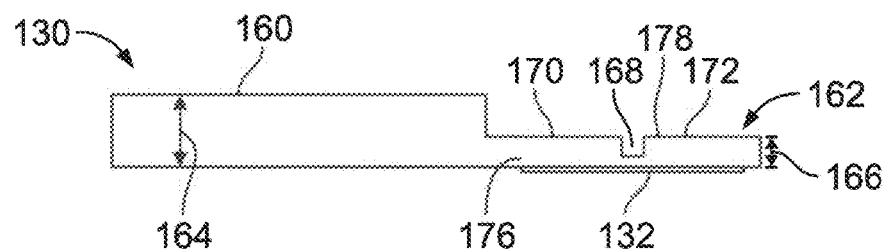
FIG. 4 illustrates a lateral view of the preliminary composite panel, according to an embodiment of the present disclosure.

FIG. 4 illustrates a lateral view of the preliminary composite panel 130, according to an embodiment of the present disclosure. Referring to FIGS. 1-4, the preliminary composite panel 130 is formed by the upper press 146 urging into and compressing the initial composite material 100 into the base 142 in the direction of arrow A. The preliminary composite panel 130 includes a main body 160, formed by the interior body-forming portion 148 compressing into the initial composite material 100 in the direction of arrow A, and an outer edge 162, formed by the edge-forming segment 150 compressing into the initial composite material 100 in the direction of arrow A. The main body 160 has a first thickness 164, and the outer edge 162 has a second thickness 166. The first thickness 164 is greater than the second thickness 166. In at least one embodiment, the first thickness 164 is twice the second thickness 166.

A groove 168 is formed in the outer edge 162. The groove 168 is formed between an interior edge portion 170 and an exterior edge portion 172. The interior edge portion 170 and the exterior edge portion 172 may be the same length. Optionally, the interior edge portion 170 and the exterior edge portion 172 may have different lengths. As shown, the groove 168 may be formed to provide a first half, such as the interior edge portion 170, and a second half, such as exterior edge portion 172.

The groove 168 is formed proximate to the laminate layer 132. For example, as shown, the groove 168 is over the laminate layer 132. In this manner, the laminate layer 132 is positioned around at least a portion of the groove 168 when the outer edge 162 is folded, as described herein.

The laminate layer 132 can be a thin layer of material having a thickness than is less than the second thickness 166. The laminate layer 132 is bonded to and extends over a face, such as a lower surface 176 of the outer edge 162. In at least one embodiment, the laminate layer 132 extends over the lower surface 176 along an entire length of the outer edge 162. Optionally, the laminate layer 132 may extend over less than an entire length of the outer edge 162. As another example, the laminate layer 132 may extend over a lower surface of at least a portion of the main body 160 in addition to at least a portion of the outer edge 162.

As shown, the groove 168 can be a rectangular notch formed into an upper surface 178 of the outer edge 162. The groove 168 may extend over an entire width of the preliminary composite panel 130. Optionally, the groove may extend over less than entire width of the preliminary composite panel 130. The shape of the groove 168 is determined by the shape of the groove-forming protuberance 156 of the forming tool 140. Optionally, the groove 168 (and the groove-forming protuberance 156) may be shaped differently, such as triangular, semi-circular, or the like.

The groove 168 may be any shape such that when the preliminary composite panel 130 is folded over within the forming tool 140, as described herein, the folded portion fits well. For example, fitting well means leaving a slight gap to allow space for adhesive, a slight interference to compress to provide a solid panel, a close tolerance fit, and/or the like. As another example, a panel having a complex curved shape may include a groove 168 having a complex curvature to allow for a proper fit. Further, the groove 168 need not be formed by the shape of a tool or cutter. For example, a cutter may make multiple passes at different orientations to carve out a groove shape that is not the shape of the tool.

As noted, the forming tool 140 forms the preliminary composite panel 130 by compressing the initial composite material 100, thereby bonding the thermoplastic matrix 108 to the carbon fibers 110, and bonding the laminate layer 132 to the lower surface 176 below the groove 168.

Figure 5:
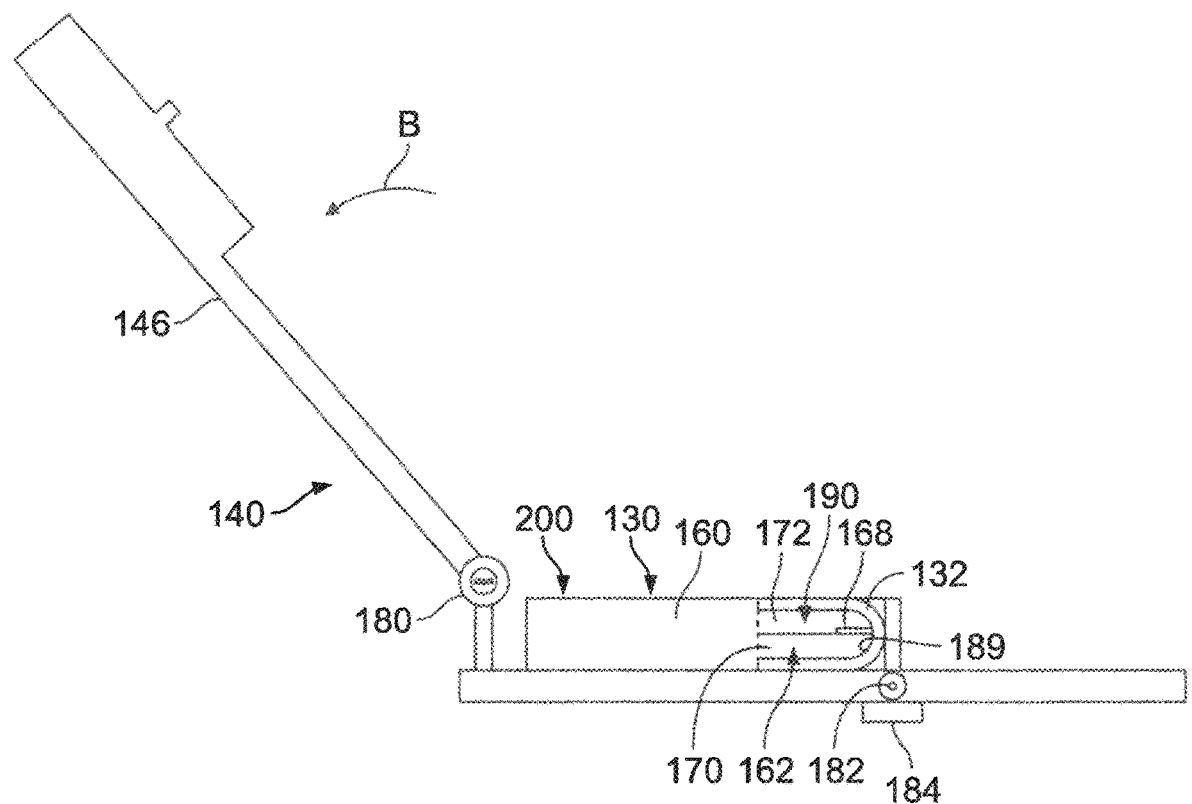
FIG. 5 illustrates a lateral view of the outer edge of the preliminary composite panel folded over within the forming tool, according to an embodiment of the present disclosure.

FIG. 5 illustrates a lateral view of the outer edge 162 of the preliminary composite panel 130 folded over within the forming tool 140, according to an embodiment of the present disclosure. Referring to FIGS. 1-5, after the upper press 146 forms the preliminary composite panel 130, as shown in FIGS. 3 and 4, the upper press 146 is moved off the preliminary composite panel 130 in the direction of arrow B. The upper press 146 can be operatively coupled to an actuator 180, such as a motor, which automatically pivots, lifts, opens, or otherwise removes the upper press 146 in relation to the preliminary composite panel 130.

In at least one embodiment, the forming tool also includes a roller 182. The roller 182 can be part of, or operatively coupled to, the base 142. The roller 182 can be positioned proximate to the groove 168, shown in FIG. 4. The roller 182 can be operatively coupled to an actuator 184, which is configured to operate the roller 182.

After the upper press 146 is moved off the preliminary composite panel 130, the roller 182 is operated to roll, fold, or otherwise move the exterior edge portion 172 over the interior edge portion 170 about (for example, along) the groove 168. For example, the roller 182 rolls the exterior edge portion 172 onto the interior edge portion 170. Because the exterior edge portion 172 and the interior edge portion 170 can be half the thickness of the main body 160, the ensuring folded outer edge 162 can be the same thickness as the main body 160. Further, the outer edge 162 (after folding) includes the laminate layer 132 folded around an outer surface 189 of an external folded edge 190 (formed by the exterior edge portion 172 folded over the interior edge portion 170), thereby providing an automatically formed edge wrapped edge portion. As such, a composite panel 200 is formed.

Figure 6:
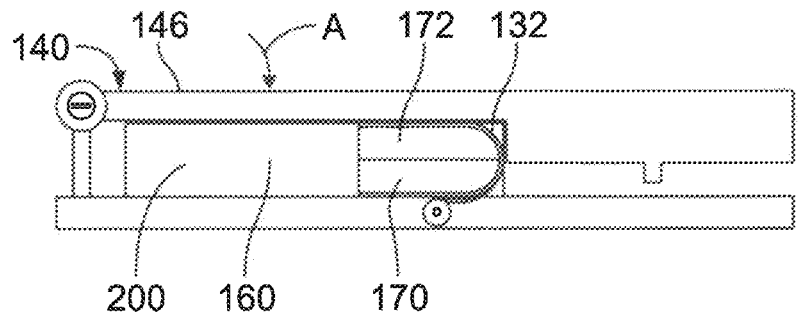
FIG. 6 illustrates a lateral view of a composite panel formed within the forming tool, according to an embodiment of the present disclosure.

FIG. 6 illustrates a lateral view of the composite panel 200 formed within the forming tool 140, according to an embodiment of the present disclosure. After the external folded edge 190 is formed, as described with respect to FIG. 5, the upper press 146 can once again urged onto the composite panel 200, thereby compressing the external folded edge 190, which bonds the exterior edge portion 172 to the interior edge portion 170 and the laminate layer 132 around the external folded edge 190. Thus, after the external folded edge is formed, the composite panel 200, including the laminate layer 132, can be subsequently compressed. Alternatively, the upper press 146 may not be urged onto the composite panel 200 after the external folded edge 190 is formed (as shown in FIG. 5).

Figure 7:
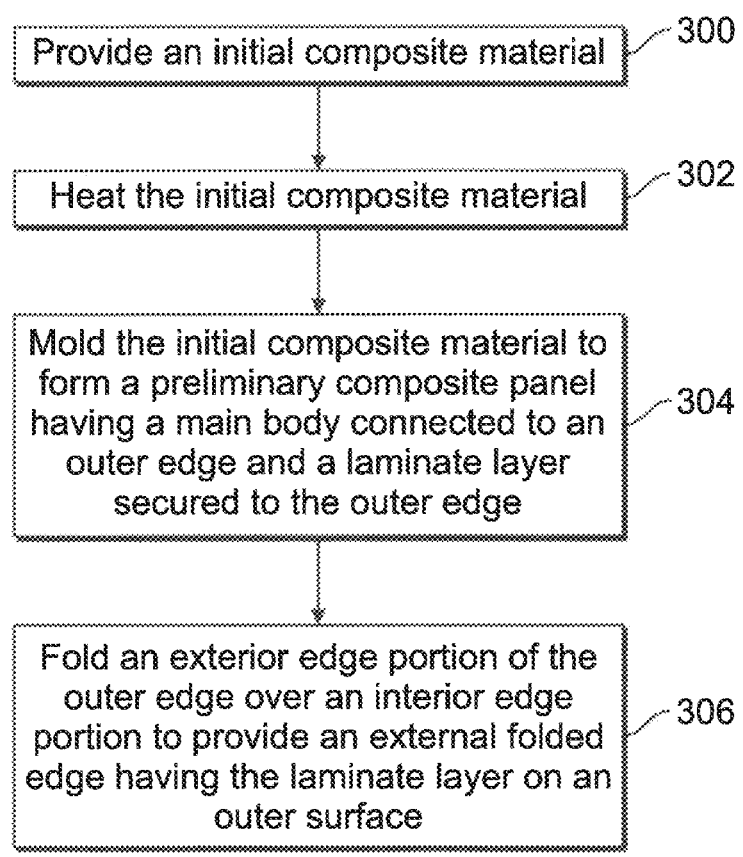
FIG. 7 illustrates a flow chart of a method of forming a composite panel, according to an embodiment of the present disclosure.

FIG. 7 illustrates a flow chart of a method of forming the composite panel, according to an embodiment of the present disclosure. Referring to FIGS. 1-7, the method begins at 300, at which the initial composite material 100 is provided. At 302, the initial composite material 100 is heated, such as within the heating device 120, such as to a temperature within a range of 500-650° F. Next, at 304, the initial composite material 100 is molded, such as by the forming tool 140, to form the preliminary composite panel 130 having the main body 160 connected to an outer edge 162 and a laminate layer 132 secured to the outer edge 162. The initial composite material 100 remains heated (such as within a range of 400-500° F.) during the molding. The molding can occur through compression, such as within the forming tool 140, for a period of 2 minutes or less, for example. At 306, the exterior edge portion 172 of the outer edge 162 is folded over the interior edge portion 170 to provide the external folded edge 190 having the laminate layer 132 on the outer surface 189, thereby providing the composite panel 200.

The composite panel 200 may provide interior walls within an internal cabin of a vehicle, such as a commercial aircraft.

Figure 8:
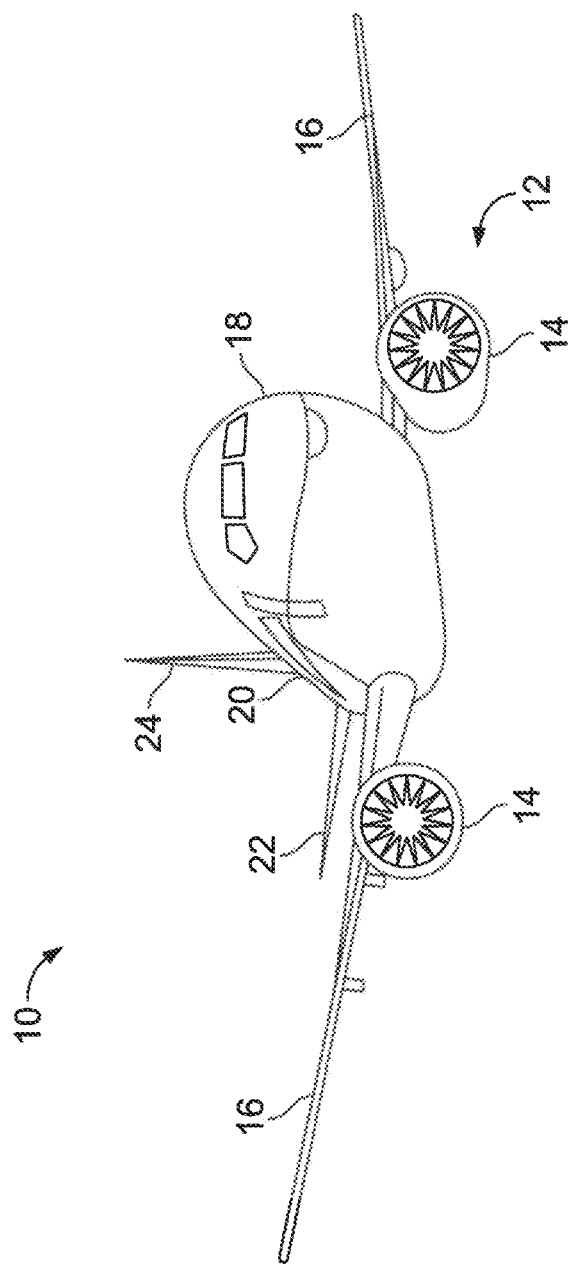
FIG. 8 illustrates a perspective front view of an aircraft, according to an embodiment of the present disclosure.

FIG. 8 illustrates a perspective top view of a vehicle, such as an aircraft 10, according to an embodiment of the present disclosure. The aircraft 10 includes a propulsion system 12 that includes two engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and economy sections), and an aft section. Overhead stowage bin assemblies may be positioned throughout the internal cabin. Various portions of the internal cabin, including sidewall panels, the ceiling, the floor, the stowage bin assemblies, and the like may be formed by composite panels, such as shown and described herein.

Alternatively, instead of an aircraft, embodiments of the present disclosure may be used with various other vehicles, such as automobiles, buses, locomotives and train cars, seacraft, spacecraft, and the like.

Figure 9A:
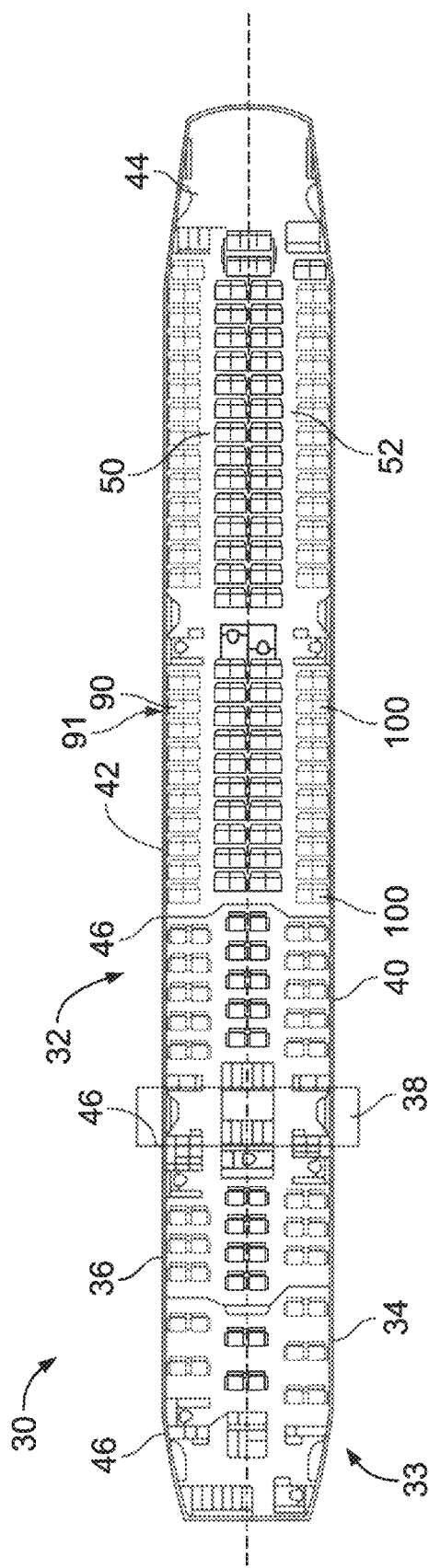
FIG. 9A illustrates a top plan view of an internal cabin of an aircraft, according to an embodiment of the present disclosure.

FIG. 9A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 9A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Seat assemblies 90 are positioned throughout the internal cabin 30. The seat assemblies 00 may be arranged in rows 91.

Figure 9B:
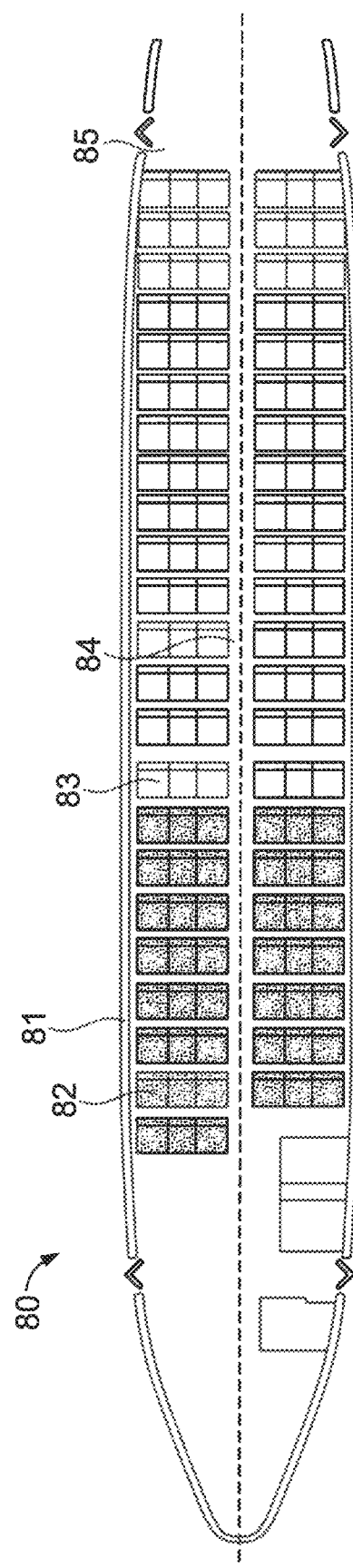
FIG. 9B illustrates a top plan view of an internal cabin of an aircraft, according to an embodiment of the present disclosure.

FIG. 9B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seat assemblies 90, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

In at least one embodiment, portions of the internal cabins 30 (shown in FIG. 9A) and 30 (shown in FIG. 9B) of the aircraft are formed by composite panels, as described with respect to FIGS. 1-7.

As described herein, embodiments of the present disclosure provide faster, cheaper, and more efficient methods of a forming composite panel. Embodiments of the present disclosure provide systems and methods for efficiently covering a peripheral edge of a composite panel. Further, embodiments of the present disclosure provide systems of methods for automatically covering a peripheral edge of a composite panel, such as via a forming system.

Embodiments of the present disclosure provide systems and methods for efficiently forming edge-wrapped composite panels. Unlike conventional, manual edge wrapping methods, embodiments of the present disclosure provide systems and methods that can efficiently and automatically provide edge wrapped decorative laminates around edges of composite panels. The decorative laminate is not trimmed, as in prior known methods, thereby providing an efficient forming method that produces less waste.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method of forming a composite panel, comprising:
providing an initial composite material;
heating the initial composite material;
molding the initial composite material to form a preliminary composite panel having a main body connected to an outer edge and a laminate layer secured to the outer edge; and
folding an exterior edge portion of the outer edge over an interior edge portion to provide an external folded edge having the laminate layer on at least a portion of an outer surface.

2. The method of claim 1, wherein said folding comprises folding the exterior edge portion along a groove between the exterior edge portion and the interior edge portion.

3. The method of claim 1, wherein said providing comprises forming the initial composite material of a thermoplastic matrix and carbon fibers.

4. The method of claim 3, wherein the carbon fibers are recycled.

5. The method of claim 1, wherein said heating comprises heating the initial composite material to a temperature within a range between 500–650° F.

6. The method of claim 1, wherein said molding comprises co-molding the preliminary composite panel along with the laminate layer.

7. The method of claim 1, wherein the main body has a first thickness, and the outer edge has a second thickness, and wherein the first thickness is greater than the second thickness.

8. The method of claim 7, wherein the first thickness is twice the second thickness.

9. The method of claim 1, wherein said molding further comprises forming a groove in the outer edge.

10. The method of claim 9, wherein said forming the groove comprises forming the groove between the interior edge portion and the exterior edge portion.

11. The method of claim 10, wherein said forming the groove further comprises forming the groove proximate to the laminate layer.

12. The method of claim 1, wherein said folding comprises rolling the exterior edge portion of the outer edge onto the interior edge portion.

13. The method of claim 1, wherein said folding provides the external folded edge having a same thickness as the main body.

14. The method of claim 1, further comprising subsequently compressing the composite panel after said folding.

15. A method of forming a composite panel, comprising:
providing an initial composite material, wherein said providing comprises forming the initial composite material of a thermoplastic matrix and carbon fibers;
heating the initial composite material;
molding the initial composite material to form a preliminary composite panel having a main body connected to an outer edge and a laminate layer secured to the outer edge, wherein said molding comprises co-molding the preliminary composite panel along with the laminate layer;
folding an exterior edge portion of the outer edge over an interior edge portion to provide an external folded edge having the laminate layer on at least a portion of an outer surface, wherein said folding comprises folding the exterior edge portion along a groove between the exterior edge portion and the interior edge portion; and
subsequently compressing the composite panel after said folding.

16. The method of claim 15, wherein the carbon fibers are recycled.

17. The method of claim 15, wherein said heating comprises heating the initial composite material to a temperature within a range between 500–650° F.

18. The method of claim 15, wherein the main body has a first thickness, and the outer edge has a second thickness, and wherein the first thickness is greater than the second thickness.

19. The method of claim 15, wherein said molding further comprises forming a groove in the outer edge, wherein said forming the groove comprises forming the groove between the interior edge portion and the exterior edge portion, and wherein said forming the groove further comprises forming the groove proximate to the laminate layer.

20. The method of claim 15, wherein said folding further comprises rolling the exterior edge portion of the outer edge onto the interior edge portion, and wherein said folding provides the external folded edge having a same thickness as the main body.

* * * * *